United States Patent [19]
Lutz

[11] Patent Number: 5,604,312
[45] Date of Patent: Feb. 18, 1997

[54] RATE-OF-ROTATION SENSOR

[75] Inventor: Markus Lutz, Reutlingen, Germany

[73] Assignee: Robert Bosch GmbH, Stuttgart, Germany

[21] Appl. No.: 536,883

[22] Filed: Sep. 29, 1995

[30] Foreign Application Priority Data

Nov. 25, 1994 [DE] Germany ............... 44 42 033

[51] Int. Cl.$^6$ ....................................... G01P 9/04
[52] U.S. Cl. ......................... 73/504.14; 73/504.12
[58] Field of Search ................ 73/504.12, 504.14, 73/504.04, 514.32

[56] References Cited

U.S. PATENT DOCUMENTS

| 5,275,047 | 1/1994 | Zabler et al. ............... 73/504.12 |
| 5,396,797 | 3/1995 | Hulsing, III ............... 73/504.04 |
| 5,447,067 | 9/1995 | Biebl et al. ............... 73/514.32 |

FOREIGN PATENT DOCUMENTS

| 4022495 | 1/1992 | Germany . |
| 4032559 | 4/1992 | Germany . |
| 4041582 | 6/1992 | Germany . |
| 4228795 | 3/1994 | Germany . |
| 4241045 | 5/1994 | Germany . |

*Primary Examiner*—John E. Chapman
*Attorney, Agent, or Firm*—Kenyon & Kenyon

[57] ABSTRACT

A rate-of-rotation sensor comprises an oscillatory mass on which an acceleration sensor is disposed so that the acceleration sensor can be deflected parallel to the surface of the oscillatory mass. With this arrangement, a measurement of the Coriolis force parallel to the surface of the oscillatory mass is possible.

6 Claims, 2 Drawing Sheets

RATE-OF-ROTATION SENSOR

BACKGROUND INFORMATION

German Patent Application No. DE 40 32 559 describes a rate-of-rotation sensor in which an acceleration sensor is disposed on a plate-shaped oscillatory mass and can be deflected perpendicular to the plane of the oscillatory mass.

SUMMARY OF THE INVENTION

The rate-of-rotation sensor according to the present invention has the advantage that an acting Coriolis force, which acts parallel to the surface of the oscillatory mass, can be measured.

It is particularly advantageous to design the acceleration sensor in the form of a comb structure. The comb structure can be manufactured in a relatively simple fashion and permits a high measurement accuracy on account of the large capacitive surfaces.

A further advantageous refinement of the rate-of-rotation sensor resides in deflectably connecting the oscillatory mass to a frame by means of folded webs so that, in the case of an oscillation of the oscillatory mass, a stressing of the webs takes place only with respect to bending. Of course, it is also possible to use webs which are folded a multiple of the double folding.

A further advantageous refinement of the rate-of-rotation sensor resides in arranging two oscillatory masses with, in each case, one acceleration sensor and exciting the two oscillatory masses to oscillation in antiphase. By using oscillatory masses oscillating in antiphase, the antiphase evaluation of the measured signals of the two acceleration sensors is possible, thereby disturbing accelerations being filtered out by forming the difference of the measured signals.

Furthermore, it is advantageous to connect the two oscillatory masses, via two doubly-folded webs, to two further webs connected to the frame. In this manner, the antiphase oscillation of the two oscillatory masses is improved by the selected coupling of the two oscillatory masses.

DETAILED DESCRIPTION

Figure 1:
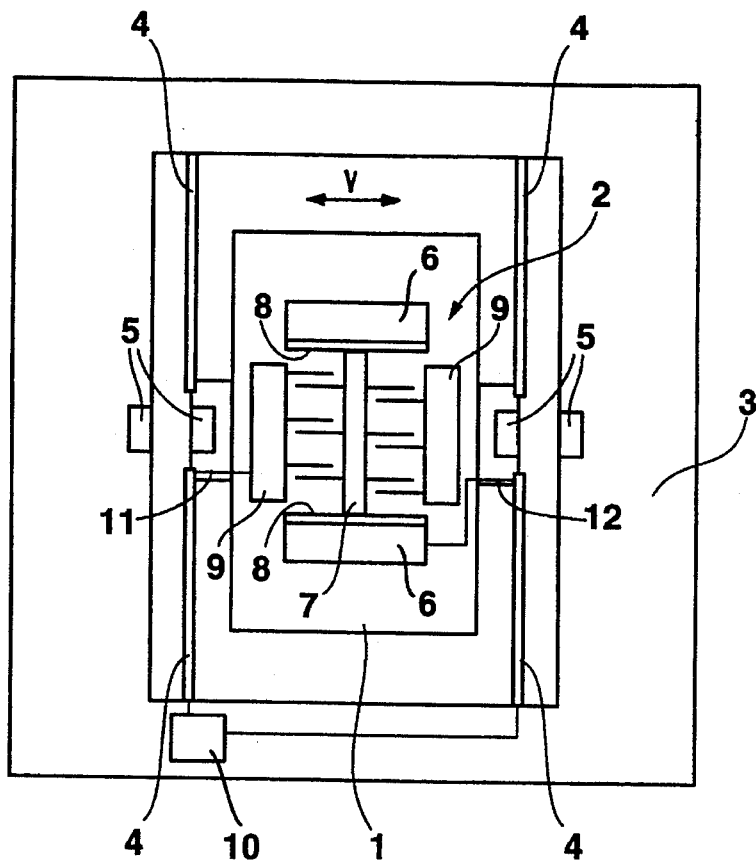
FIG. 1 shows a rate-of-rotation sensor, according to the present invention.

FIG. 1 shows a rate-of-rotation sensor which has a rectangular frame 3. An oscillatory mass 1 is disposed within the frame 3 and is connected to the frame 3 via four webs 4 so as to be deflectable in one direction. In this illustrative embodiment, the oscillatory mass 1 is designed as a rectangular silicon plate. The webs 4 are designed as long, high and narrow webs, i.e. with a high aspect ratio, so that the oscillatory mass 1 can be deflected only in the plane of the frame 3. In each instance, two webs 4 are disposed in a line and two webs 4 are aligned parallel to one another. A deflection of the oscillatory mass 1 takes place perpendicular to the line of the webs 4. Drive means 5 are disposed on the frame 3 and the oscillatory mass 1, which drive means displace the oscillatory mass 1 into an oscillation perpendicular to the line of the webs 4. Electromagnetic, electrostatic or piezoelectric drives, for example, can be used as drive means.

A deflectable acceleration sensor 2 is disposed on the oscillatory mass 1, which acceleration sensor comprises two blocks 6 disposed opposite one another; in this case, a deflectable mass 7 is disposed between the blocks 6. The deflectable mass 7 is connected to the blocks 6 via respective transverse beams 8, and is deflectably disposed between the blocks 6. The blocks 6 are firmly connected to the oscillatory mass 1. The deflectable mass 7 is in the form of an elongated beam, which is firmly connected at each of its ends to one of the transverse beams 8.

Three plates (blades) aligned perpendicular to the beam are disposed on each side of the beam. On each side of the deflectable mass 7, a mounting 9 is disposed on the oscillatory mass 1 parallel to the deflectable mass 7. Three plates extend from each mounting 9 in a direction toward the deflectable mass 7. Each of the plates of the mounting 9 and the corresponding plate of the deflectable mass 7 form one capacitor. The transverse beams 8 are designed so that an acting Coriolis force leads to a deflection of the deflectable mass 7 in a direction toward a block 6. As a result of this, the spacings between the plates of the mounting 9 and the plates of the deflectable mass 7 are altered, whereby a detection of the acting Coriolis force takes place by means of capacitive measurements.

A first lead 11 is passed from the mountings 9 via a web 4 to an evaluating unit 10. Likewise, a second lead 12 is passed from the deflectable mass 7 to the evaluating unit 10. Thus, the evaluating unit 10 determines, via the alteration of the capacitances of the plates, a measured signal proportional to the Coriolis force.

In this illustrative embodiment, the rate-of-rotation sensor is constructed from silicon. However, other materials can also be used.

Figure 2:
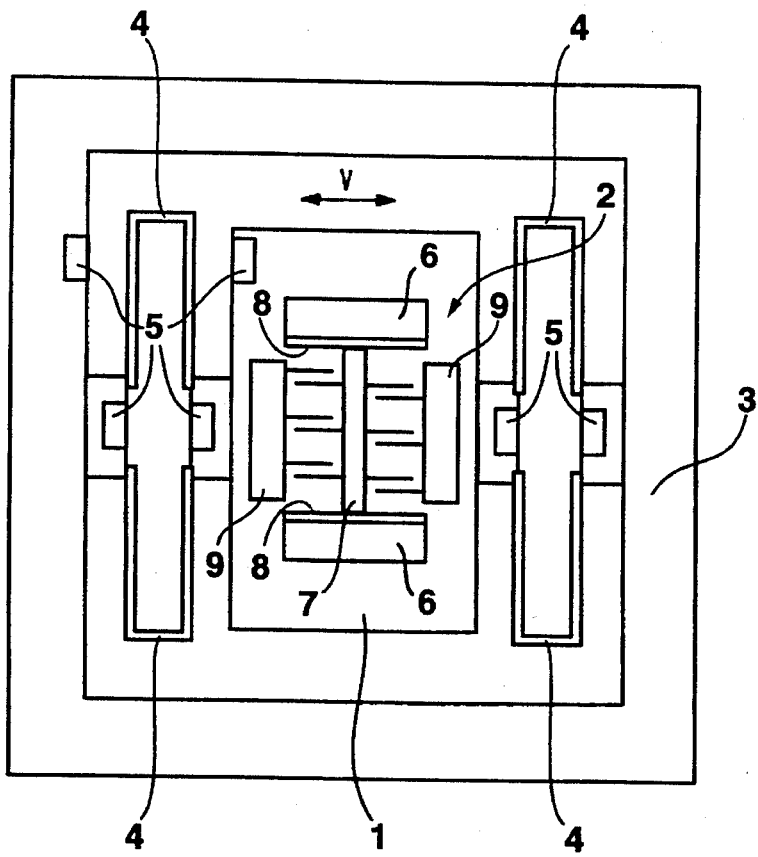
FIG. 2 shows a rate-of-rotation sensor having a special suspension, according to the present invention.

FIG. 2 shows an oscillatory mass 1 with an acceleration sensor 2 corresponding to FIG. 1; in this case, however, the webs 4, by means of which the oscillatory mass 1 is connected to the frame 3, have a special shape. Four webs 4 are used for the suspension of the oscillatory mass 1, which webs are in each case doubly folded. One end of each web 4 is connected to the oscillatory mass 1 and a second end of each web 4 is connected to the frame 3. The points of connection of each web 4 to the frame 3 and to the oscillatory mass 1 lie in a straight line parallel to the direction of oscillation of the oscillatory mass 1.

As a result of the double folding of the webs 4, it is achieved that, in the case of oscillation of the oscillatory mass 1, the webs 4 are stressed only with respect to bending. In this manner, the oscillatory mass 1 becomes a linear oscillator, i.e. the acting force is always proportional to the deflection of the oscillatory mass 1. Thus, the direction of oscillation of the oscillatory mass 1 is precisely predetermined, whereby the disturbing influences on the acceleration sensor 2 are reduced. Thus, as a result of the oscillatory mass 1, no disturbing influences on the acceleration sensor occur anymore. As a result of this, the accuracy of the proportionality of the measured signal of the acceleration sensor 2 to the acting Coriolis force is improved.

Figure 3:
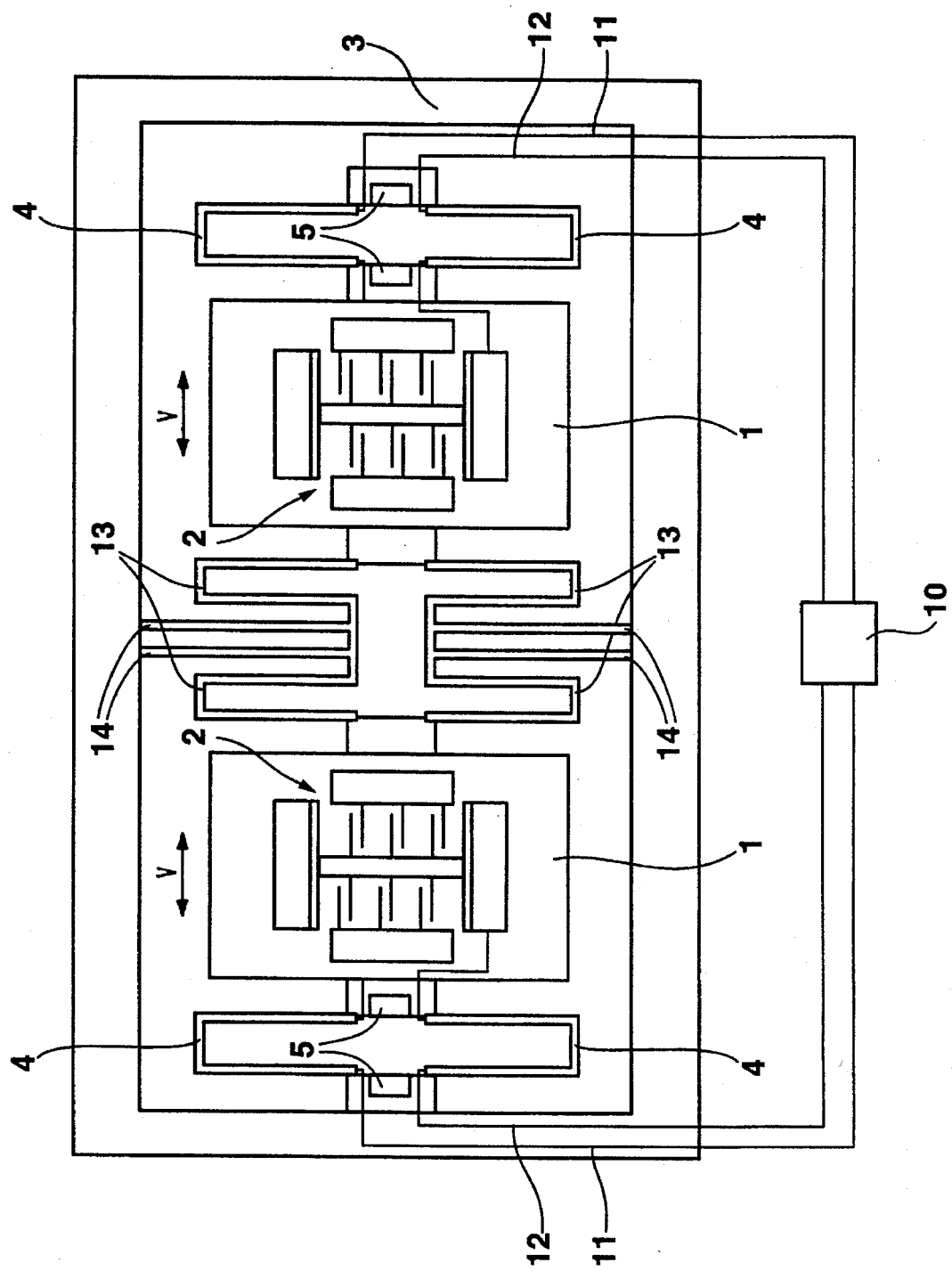
FIG. 3 shows a rate-of-rotation sensor having two oscillatory masses, according to the present invention.

FIG. 3 shows a rate-of-rotation sensor which comprises two oscillatory masses disposed in a frame. Each oscillatory mass 1 is connected, via two doubly folded webs 4, to a side part of the frame 3. The two oscillatory masses 2 are connected to one another via two doubly folded second webs 13. In each case, two third webs 14 are disposed between the two second webs 13, which third webs create a connection between the two second webs 13 and the frame 3. The suspension between the two oscillatory masses 1, which comprises the second and third webs 13, 14, is designed so that an antiphase oscillation of the oscillatory masses 2 is assisted.

The measured signals of the two acceleration sensors 2 are passed via one first and one second lead 11, 12 to an evaluating unit 10. The evaluating unit 10 carries out a difference determination of the measured signals, whereby disturbances which are generated by the oscillatory masses 1 are filtered out. This is possible on account of the antiphase oscillation of the oscillatory masses 1.

The rate-of-rotation sensor is preferably structured out of silicon; in this case, the anisotropic etching process described in German Patent Application No. DE 42 41 045, for example, may be used for the structuring of the silicon. The transverse beams 8, by means of which the deflectable mass 7 of the acceleration sensor 2 is connected to the oscillatory mass 1, are designed with a high aspect ratio, i.e. narrow and high, so that the deflectable mass 7 is suspended in a manner insensitive to deflections perpendicular to the surface of the oscillatory mass 1. As a result of the use of folded webs, which, in the case of oscillation, are stressed only with respect to bending, a rate-of-rotation sensor is produced which shows a linear oscillation behavior; in this case, harmonics are suppressed and the oscillatory mass 1 is guided very precisely and in disturbance-proof fashion, in the predetermined direction of oscillation.

What is claimed is:

1. A rate-of-rotation sensor comprising:

a plurality of webs elongated in a first direction, the plurality of webs being arranged parallel to one another in the first direction;

an oscillatory system including at least one oscillatory mass suspended on the plurality of webs;

means for exciting the oscillatory system into oscillations in a second direction, the second direction being perpendicular to the first direction; and at least one acceleration sensor, coupled to the oscillatory system, for detecting an acceleration in the first direction.

2. The sensor according to claim 1, wherein the acceleration sensor is comb-shaped.

3. The sensor according to claim 1, wherein the acceleration sensor includes:

first and second transverse beams coupled to the oscillatory system, and a deflectable mass having first and second ends connected to the first and second transverse beams, respectively, and wherein the first and second transverse beams suppress deflection of the deflectable mass in the second direction.

4. The sensor according to claim 1, further comprising:

a frame; and at least two doubly folded webs for suspending the oscillatory system on the frame such that, when the oscillatory system oscillates in the second direction, the webs are stressed only with respect to bending.

5. The sensor according to claim 4, further comprising:

a second oscillatory system coupled to the frame;

a second acceleration sensor coupled to the second oscillatory system; and at least one further web for coupling the oscillatory system to the second oscillatory system such that the oscillatory system and the second oscillatory system oscillate in antiphase.

6. The sensor according to claim 5, wherein the further web is at least doubly folded.

* * * * *